United States Patent
Satou

(10) Patent No.: US 10,164,237 B2
(45) Date of Patent: Dec. 25, 2018

(54) AIR BATTERY CELL WITH ELECTRICALLY CONDUCTIVE MEMBERS AND BATTERY PACK

(71) Applicant: NISSAN MOTOR CO., LTD., Yokohama-shi, Kanagawa (JP)

(72) Inventor: Fuminori Satou, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 29 days.

(21) Appl. No.: 14/911,395

(22) PCT Filed: Jun. 16, 2014

(86) PCT No.: PCT/JP2014/065865
§ 371 (c)(1),
(2) Date: Feb. 10, 2016

(87) PCT Pub. No.: WO2015/029547
PCT Pub. Date: Mar. 5, 2015

(65) Prior Publication Data
US 2016/0190668 A1    Jun. 30, 2016

(30) Foreign Application Priority Data

Aug. 26, 2013  (JP) ................. 2013-174852

(51) Int. Cl.
| | |
|---|---|
| *H01M 2/24* | (2006.01) |
| *H01M 12/06* | (2006.01) |
| *H01M 2/02* | (2006.01) |
| *H01M 2/20* | (2006.01) |
| *H01M 2/06* | (2006.01) |

(Continued)

(52) U.S. Cl.
CPC ............. *H01M 2/24* (2013.01); *H01M 2/024* (2013.01); *H01M 2/025* (2013.01); *H01M 2/06* (2013.01); *H01M 2/1077* (2013.01); *H01M 2/202* (2013.01); *H01M 2/26* (2013.01); *H01M 12/06* (2013.01); *H01M 2220/20* (2013.01)

(58) Field of Classification Search
None
See application file for complete search history.

(56) References Cited

U.S. PATENT DOCUMENTS

| | | |
|---|---|---|
| 2005/0208373 A1 | 9/2005 | Davis et al. |
| 2005/0208381 A1 | 9/2005 | Boulton et al. |

(Continued)

FOREIGN PATENT DOCUMENTS

| | | |
|---|---|---|
| EP | 2757629 A1 | 7/2014 |
| EP | 2808938 A1 | 12/2014 |

(Continued)

*Primary Examiner* — Ula C Ruddock
*Assistant Examiner* — Tony S Chuo
(74) *Attorney, Agent, or Firm* — Young Basile Hanlon & MacFarlane, P.C.

(57) ABSTRACT

An air battery includes: a cell frame of an insulating material having a bottomed frame shape in which an electrolytic solution and an anode are stored; a cathode that is disposed opposite the anode across the electrolytic solution stored in the cell frame; and a current collecting member that is electrically connected to the anode, wherein the anode and the current collecting member are electrically connected to each other via a plurality of electrically conducting members that penetrate a bottom of the cell frame.

12 Claims, 16 Drawing Sheets

(51) Int. Cl.
*H01M 2/10* (2006.01)
*H01M 2/26* (2006.01)

(56) References Cited

U.S. PATENT DOCUMENTS

| | | | |
|---|---|---|---|
| 2005/0214648 A1 | 9/2005 | Boulton et al. | |
| 2006/0204839 A1 | 9/2006 | Richards et al. | |
| 2014/0370400 A1* | 12/2014 | Miyazawa | H01M 12/08 429/405 |
| 2015/0086882 A1 | 3/2015 | Tsukada et al. | |

FOREIGN PATENT DOCUMENTS

| | | | | |
|---|---|---|---|---|
| JP | 61284072 A | 12/1986 | | |
| JP | 07085899 A | 3/1995 | | |
| JP | 2008541398 A | 11/2008 | | |
| JP | 2010186727 A | 8/2010 | | |
| JP | 2013201122 A | 10/2013 | | |
| WO | WO 2013/061067 A1 * | 5/2013 | ............ | H01M 12/04 |
| WO | WO 2013/111703 A1 * | 8/2013 | ............ | H01M 12/06 |

\* cited by examiner

US 10,164,237 B2

AIR BATTERY CELL WITH ELECTRICALLY CONDUCTIVE MEMBERS AND BATTERY PACK

CROSS REFERENCE TO RELATED APPLICATION

The present application is based on Japanese Patent Application No. 2013-174852 filed on Aug. 26, 2013, the entire content of which is herein incorporated by reference.

TECHNICAL FIELD

The present invention is directed to an air battery (cell) that uses oxygen in the air as an active material, particularly the current collecting technique thereof. Further, the present invention relates to the structure of an air battery in which electrodes of adjacent cells can be connected to each other at a low resistance and to a battery pack (battery, cell stack) composed of such air batteries (cells).

BACKGROUND

An air battery is a battery (cell) that uses oxygen in the air as a cathode active material and a metal such as aluminum (Al), iron (Fe) and zinc (Zn) as an anode active material.

Since oxygen in the air is used as a cathode active material, it is not required for such batteries to store a cathode active material in the battery case. This enables high energy density, small size and light weight of a battery, and applications as a power supply of portable devices and also as a drive power supply for electric vehicles and the like has been expected.

To put such air batteries into practice, for example as a drive power supply for cars, it is required to serially connect a plurality of large batteries in series in order to achieve a required high output voltage and a required large capacity.

For example, Japanese Patent No. H07-085899 describes a technique for stabilizing the electrical contact between terminals of adjacent cells so as to reduce fluctuation in output voltage. The technique involves a first terminal that is electrically connected to a first electrode of a cell and a second terminal that is electrically connected to a second electrode of the cell and is in contact with a first terminal of the adjacent cell, in which one of the first and second terminals is formed in a shape with a flat surface while the other is formed in a shape of elastic separate plates that elastically come in contact with the flat surface.

In the current collecting structure described in Japanese Patent No. H07-085899, the electrical connection from an aluminum electrode (anode) to the next air electrode (cathode) is achieved via a current collecting wire, an anode current collecting frame, the second terminal and the first terminal. The two terminals are connected to each other by abutment using a spring.

That is, the electrical connection between cells is achieved through a path that runs out of the cells in both of the cathode and anode. Accordingly, a problem is that the long current collecting path results in very large current collecting loss. This problem is more significant and more serious in larger and higher-power batteries.

SUMMARY

The present invention was made in order to solve the above-described problem of connecting structure in the air batteries known in the art, and an object thereof is to provide an air battery that can reduce the current collecting loss between cells and is suitable for serial stacking, and a battery pack composed of such batteries.

As a result of the inventors' keen study for achieving the above-described object, they found that the above-described object can be achieved by forming a plurality of through holes in the bottom of a cell frame where electrolytic solution is stored and forming an electrical connection to an anode in the cell frame through the through holes, providing a current collecting member that also serves as a spacer to form a ventilation space between adjacent air batteries, connecting the anode with electrically conducting members by an electrically conductive double-sided tape, providing a metal foil between the anode and the electrically conducting members or providing a metal foil between the current collecting member and the electrically conducting members. The present invention was thus complete.

That is, the present invention is based on the above finding, and the air battery of the present invention includes: a cell frame of an insulating material having a bottomed frame shape in which an electrolytic solution and an anode are stored; a cathode that is disposed opposite the anode across the electrolytic solution stored in the cell frame; and a current collecting member that is electrically connected to the anode, wherein the anode and the current collecting member are connected to each other via a plurality of electrically conducting members that penetrate a bottom of the cell frame, the current collecting member serves as a spacer to form a ventilation space between adjacent air batteries, the anode and the plurality of electrically conducting members are connected to each other by an electrically conductive double-sided tape, a metal foil is provided between the anode and the plurality of electrically conducting members, or a metal foil is provided between the current collecting member and the plurality of electrically conducting members.

The battery pack of the present invention includes a stacked plurality of the above-described air batteries.

In the present invention, the anode is connected to the current collecting member via the plurality of electrically conducting members that penetrate the bottom of the cell frame, the current collecting member serves as a space to form a ventilation space between adjacent air batteries, the anode and he plurality of electrically conducting members are connected to each other by an electrically conductive double-sided tape, a metal foil is provided between the anode and the plurality of electrically conducting members, or a metal foil is provided between the current collecting member and the plurality of electrically conducting members. Accordingly, an electric current can be extracted through the shortest conducting path. Therefore, the current collecting loss can be reduced to a great extent, and the output performance can be improved.

BRIEF DESCRIPTION OF THE DRAWINGS

FIG. 6A illustrates an example of the structure in which an anode and electrically conducting members are connected to each other by an electrically conductive double-sided tape, and FIG. 6B illustrates a process for producing it;

DETAILED DESCRIPTION OF THE EMBODIMENTS

Hereinafter, an air battery and a battery pack using the same air batteries according to the present invention will be described specifically in more detail.

Figure 1A:
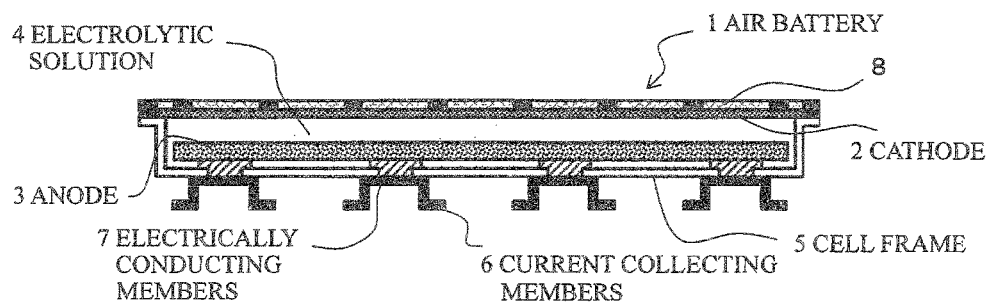
FIGS. 1A and 1B are cross sectional views of air batteries according to a first and second embodiments of the present invention respectively.

FIG. 1A is a cross sectional view of an air battery according to a first embodiment of the present invention. The air battery 1 of FIGS. 1A and 1B mainly include a cathode 2, an anode 3, a cell frame 5 that stores electrolytic solution 4 and holds the anode 3 near the bottom thereof, and a plurality of (four in the figures) current collecting members 6. The anode 3 is electrically connected to the plurality of current collecting members 6 via electrically conducting members 7 that penetrate the cell frame 5.

The cathode 2 includes a cathode catalyst layer that is formed on a gas-permeable etching plate 8 at the lower side in the figure via an electrically-conductive water-repellent layer (not shown). The cathode 2 is opposed to the anode 3 disposed on the bottom of the cell frame 5 across the electrolytic solution 4.

The cathode 2, which uses oxygen as a cathode active material, includes an oxidation-reduction catalyst for oxygen and an electrically conductive catalyst support to support the catalyst.

The catalyst component may be selected from electrode catalysts for air battery cathodes known in the art, for example, including metal oxides such as manganese dioxide and tricobalt tetroxide, metals such as platinum (Pt), ruthenium (Ru), iridium (Ir), rhodium (Rh), palladium (Pd), osmium (Os), tungsten (W), lead (Pb), iron (Fe), chromium (Cr), cobalt (Co), nickel (Ni), manganese (Mn), vanadium (V), molybdenum (Mo), gallium (Ga) and aluminum (Al) and the compounds and alloys thereof, and the like.

The size and shape of the catalyst component are not particularly limited. The catalyst component may be formed in the same shape and size as catalyst components known in the art. However, it is preferred that the catalyst component has a granular shape. Such catalyst particles have an average particle size of preferably from 30 nm to 10 μm.

When the average particle size of the catalyst particles is within the above-described range, it is possible to suitably control the balance between the catalyst availability, which is related to the effective electrode area where the electrochemical reaction proceeds, and ease of supporting the catalyst.

The "average particle size of the catalyst particles" can be measured as the crystal particle size determined from the half width of the diffraction peak of the catalyst component by X-ray diffractometry or the average size of the particles of the catalyst component measured in transmission electron micrographs.

The catalyst support serves as a support that supports the catalyst component and also as an electron conducting path that is related to electron exchange between the catalyst component and the other components. The catalyst support may be made of any material that has a specific surface area to support the catalyst component in a desired dispersed condition and also has sufficient electron conductivity, and it is preferred that the catalyst support is carbon-based. Specifically, such catalyst supports include carbon particles of carbon black, activated charcoal, coke, natural graphite, artificial graphite or the like.

When the catalyst layer is formed from the catalyst component and the catalyst support, such carbon particles functionally categorized in an aggregate carbon material that forms the main framework of the layer structure (porous layer structure) or a conducting path material that is effective for developing a conducting path in the layer in terms of the function.

Suitable aggregate carbon materials are active carbon, graphite and flake graphite, all of which tend to retain their independent particle shape to some extent in the porous layer. In particular, graphite and flake graphite are likely to form relatively many voids in the porous layer, and are therefore suitable for an aggregate carbon material of liquid-tight gas-permeable layers.

Examples of such conducting path materials include, for example, carbon black and acetylene black. In particular, acetylene black is suitable for a conducting path material of liquid-tight gas-permeable layers, since it is likely to form a chain structure and has a water-repellent surface.

The particle size of the above-described aggregate carbon material and the conducting path material depends on the air battery and a desired electromotive force. Typically, the aggregate carbon material has an average particle size of preferably from 5 μm to 300 μm, and the conducting path material has an average particle size of preferably from 50 nm to 500 nm.

When the average particle size of the aggregate carbon material is within the above-described range, it becomes possible to enhance the electrical conductivity in the in-plane direction of the aggregate carbon material and the strength of the cathode. When the average particle size of the conducting path material is within the above-described range, it becomes possible to enhance the electrical conductivity in the thickness direction of the porous layer and the gas permeability of the liquid-tight gas-permeable layer. The average particle size (median size, D50) of the aggregate carbon material and the conducting path material can be determined by dynamic light scattering.

The amount of supported catalyst component relative to the catalyst support is preferably from 1 mass % to 50 mass %, more preferably from 5 mass % to 30 mass % with respect to the total amount of the catalyst and the support that supports the catalyst. When the amount of supported catalyst component is within the above-described range, a suitable balance is achieved between the dispersion of the catalyst component in the catalyst support and the catalyst performance.

The type of the above-described catalyst component and the support that supports the catalyst component is not limited to the above-described example, and it should be understood well that the any material known in the art that is used for air batteries may be suitably used.

The etching plate 8 is constituted by, for example, a thin plate of nickel or stainless steel. The etching plate 8 has micro pores of from 0.2 mm to several mm excluding the peripheral part and the portions (described below) where the current collecting members 6 are joined, which are formed by chemical etching with a suitable mask.

The electrically-conductive water-repellent layer is liquid-tight (water-tight) against the electrolytic solution and is also gas-permeable to oxygen. The electrically-conductive water-repellent layer allows supplying oxygen to the cathode 2 while preventing the electrolytic solution 4 from leaking to the outside. The electrically-conductive water-repellent layer is composed of a water-repellent porous resin such as a polyolefin and a fluorinated resin and an electrically conductive powder such as graphite.

The anode 3 is made of a pure base metal that has a standard electrode potential less than hydrogen, or an alloy of such a metal. Such pure metals include, for example, zinc (Zn), iron (Fe), aluminum (Al), magnesium (Mg) and the like. Such alloys include, alloys of such a metal element with one or more metal elements or non-metal elements. However, the material is not limited thereto, and any material known in the art that is used for air batteries can be used.

The electrolytic solution 4 is, for example, an aqueous solution of potassium chloride (KCl), sodium chloride (NaCl), potassium hydroxide (KOH), sodium hydroxide (NaOH) or the like. However, the electrolytic solution 4 is not limited to thereto, and any electrolytic solution known in the art that is used for similar air batteries can be used.

The cell frame 5 is a bottomed container having a shallow dish shape, which is made of an insulating material such as a resin. On the bottom thereof, through holes are formed where the electrically conducting members 7 penetrate. Using a material such as a resin contributes to reducing the weight of the air battery, particularly the battery pack.

The current collecting members 6 are desirably made of a highly electrically conductive metal, particularly copper, aluminum or the like. The current collecting members 6 are electrically connected to the anode 3 via the electrically conducting member 7 to form the shortest conducting path so that the current collecting loss can be reduced.

The shape of the current collecting members 6 is not particularly limited. However, in the embodiment, the current collecting members 6 have a hat-shaped cross section.

With this cross sectional shape, the current collecting member 6 serves as a spacer between adjacent air batteries so as to ensure a space for air flow.

In the embodiment, the electrically conducting members 7 are made of electrically conductive adhesive in order to achieve a good balance between the electrical conductivity and the robust joining between the anode 3 and the current collecting member 6. However, as described below, the electrically conducting members 7 may be integrally formed with the current collecting members 6, and the material is not limited to electrically conductive adhesive but may be any material that can form robust electrical connection with the anode 3.

Figure 1B:
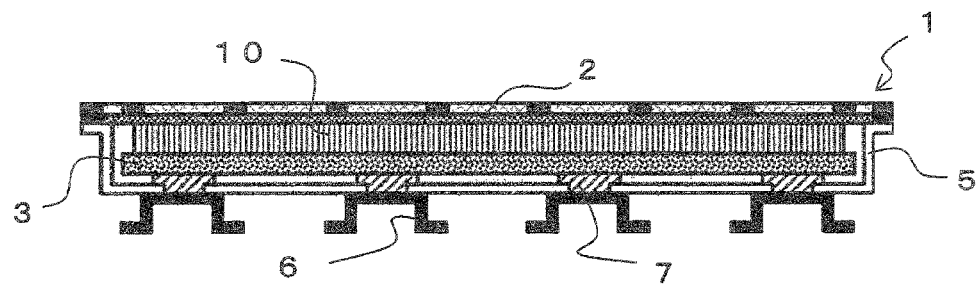

Between the cathode 2 and the anode 3, a separator 10 may be disposed, which is illustrated in FIG. 1B as a second embodiment of the present invention.

The separator 10 may be constituted by, for example, a micro porous membrane that is made of a glass paper with no water repellent finish or a polyolefin such as polyethylene and polypropylene. However, the material is not limited to them, and any material known in the art that is used for air batteries can be used.

Figure 2:
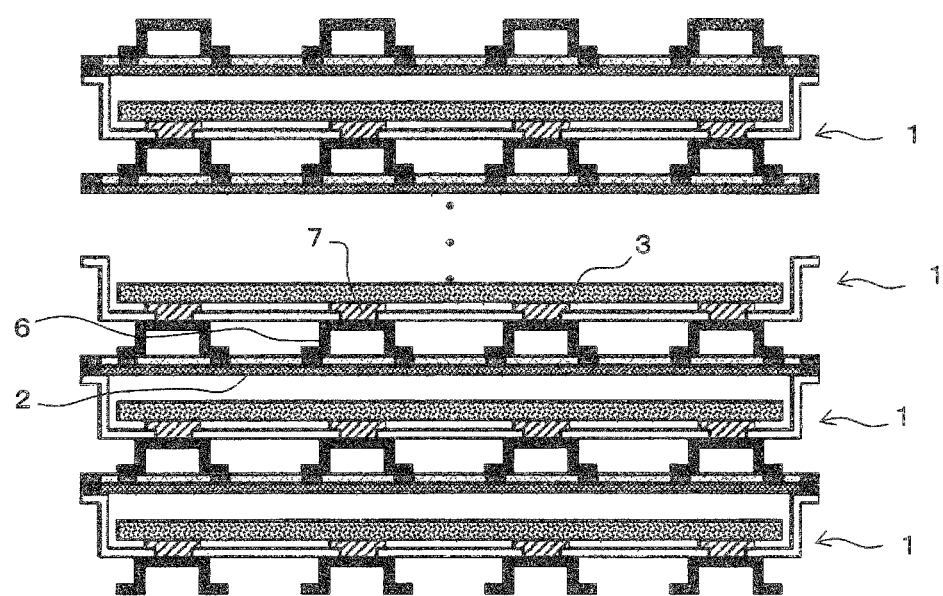
FIG. 2 is a cross sectional view of a battery pack composed of the air batteries of FIG. 1A, illustrating the stacking structure thereof.

FIG. 2 is a cross sectional view of a battery pack of the present invention in which a lot of the above-described air batteries 1 are stacked, illustrating the structure thereof. In the stacked condition as illustrated in the figure, the current collecting members 6, which are connected to the anode 3 via the electrically conducting member 7, are electrically connected to the cathode 2 of another air battery 1 located at the lower side in the figure.

Accordingly, cells can be serially connected to each other through the shortest path. Therefore, the battery pack with low current collecting loss and high output voltage can be achieved. Further, since it is not required to apply a pressing load to the cells to collect electricity, it is not required to provide sufficient strength for the load. Therefore, reduction in size and weight can be achieved.

FIG. 3A to 3D illustrate the steps of a process of producing a common component used for the repetitive structure of the battery pack of FIG. 2.

Figure 3A:
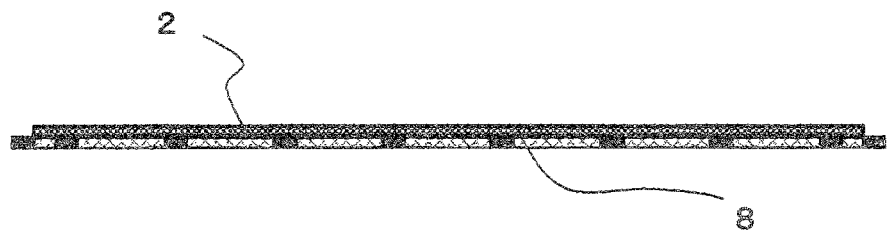
FIG. 3A to 3D illustrate a method for producing the battery pack of FIG. 2, particularly illustrate the steps of a process of producing the common components thereof.

First, as illustrated in FIG. 3A, the cathode (catalyst layer) 2 is formed on the surface of the etching plate 8 via the electrically-conductive water-repellent layer (not shown).

As described above, the etching plate 8 can be obtained by preparing a thin plate of nickel or stainless steel with a mask in required portions and forming micro ventilation pores by chemical etching excluding the peripheral part and the portions to which the current collecting members 6 are joined.

The electrically conductive water-repellent layer is formed using an ink for the electrically-conductive water-repellent layer that contains a water repellent resin such as a fluorinated resin, an electrically conductive carbon such as acetylene black and graphite and a binder in a solvent. The cathode catalyst layer is formed using an ink for the catalyst layer that contains the above-described electrically conductive carbon, the catalyst component and a binder in a solvent.

The binder is not particularly limited, and any binder known in the art that is used for air batteries can be used. In terms of the heat resistance and the chemical resistance, polytetrafluoroethylene (PTFE), polypropylene (PP), tetrafluoroethylene-perfluoroalkylvinylether copolymer (PFA), tetrafluoroethylene-hexafluoropropylene copolymer (FEP) and ethylene-tetrafluoroethylene copolymer (ETFE) are particularly preferably used.

These inks may be mixed with a surfactant or a thickener known in the art according to need.

The ink for the electrically-conductive water-repellent layer is applied on the surface of the etching plate 8 and dried at a temperature of, for example, approximately from 80° C. to 120° C., and then the ink for the catalyst layer is applied thereon and is dried similarly. Thereafter, the plate is baked at a temperature of, for example, from 100° C. to 350° C. The cathode 2 is thus laminated on the etching plate 8 via the electrically-conductive water-repellent layer.

Figure 3B:
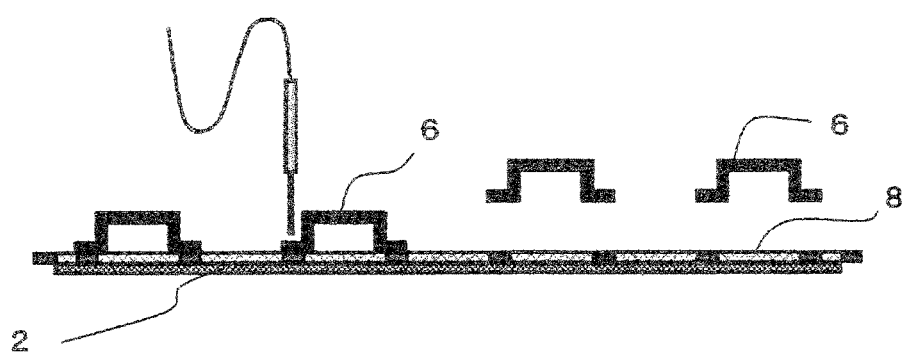

Next, as illustrated in FIG. 3B, the laminate thus obtained is flipped over so that the etching plate 8 faces upward, and the current collecting members 6 are joined to predetermined portions (non-etched gas-impermeable portions) of the etching plate 8, for example, by laser welding or seam welding.

Figure 3C:
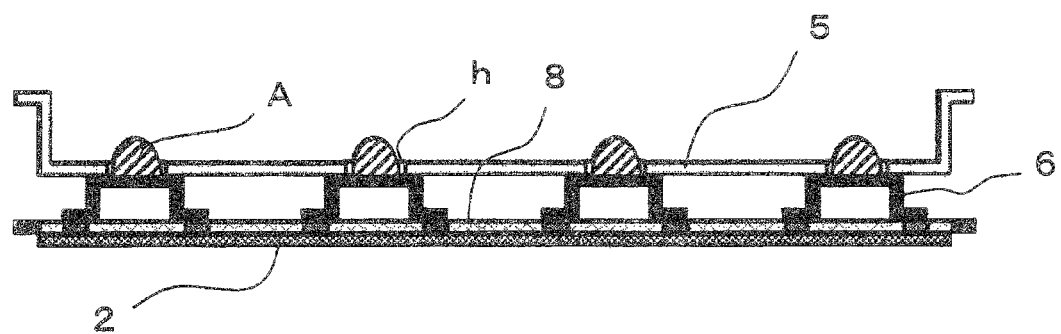

Then, as illustrated in FIG. 3C, the cell frame 5 having through holes h at predetermined locations are placed on the current collecting members 6 that have been joined to the etching plate 8. The electrically conductive adhesive A is applied to the parts of the current collecting members 6 that are exposed in the through holes h.

Figure 3D:
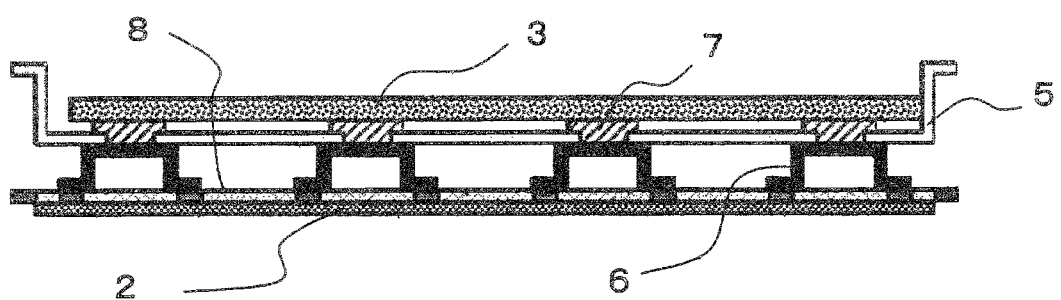

Then, as illustrated in FIG. 3D, the anode 3 of zinc, aluminum or the like is placed over the electrically conductive adhesive A and is bonded thereto by applying a pressure, so that the adhesive A closes the through holes of the cell frame 5 to ensure the sealing property against the electrolytic solution. At the same time, the current collecting members 6 are bonded to the anode 3, and the electrically conductive adhesive A is cured to be the electrically conducting members 7 so that the current collecting members 6 and the anode 3 are electrically connected to each other. The common component for the battery pack is thus complete.

Figure 4:
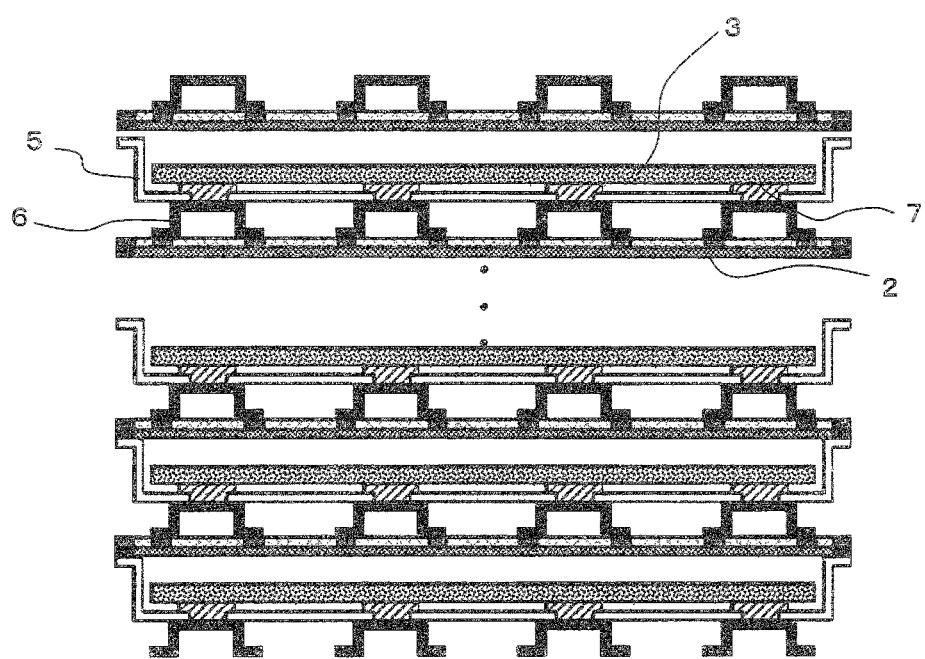
FIG. 4 is a cross sectional view of a completed battery pack that is assembled through the steps of FIG. 3A to 3D.

Then, an adhesive (which needs not be electrically conductive) is applied to the upper outer part of the peripheral part of the cell frame 5, and a lot of the same common components are stacked as illustrated in FIG. 4. The battery pack with low current collecting loss, high output voltage and large capacity is thus complete. As illustrated in FIG. 4, it is required that only the etching plate 8 with the cathode 2 and the current collecting members 6 is stacked on the uppermost common component, while the anode 2 is not provided to the lowermost common component.

In the present invention, a sealer may be provided between the cell frame 5 and the current collecting members 6. Further, the current collecting members 6 may be integrally formed with the electrically conducting members 7 so that they can also serve as the electrically conducting members.

Figure 5A:
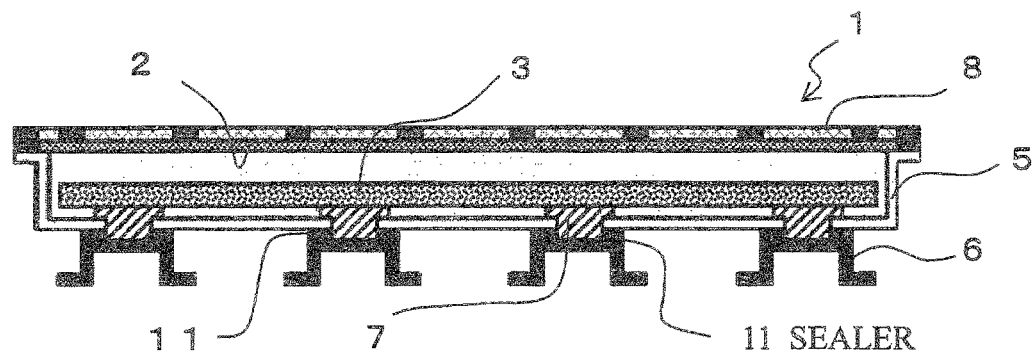
FIGS. 5A and 5B are cross sectional views of air batteries according to third and fourth embodiments of the present invention respectively, in which sealers are interposed between a cell frame and current collecting members.

FIG. 5A is a cross sectional view of an air battery according to a third embodiment of the present invention. The air battery 1 of the figure includes sealers 11 that are made of an adhesive or sticking resin, a double-sided tape or the like and are interposed between the cell frame 5 and the current collecting members 6. This configuration can enhance the sealing property between the cell frame 5 and the current collecting members 6.

Figure 5B:
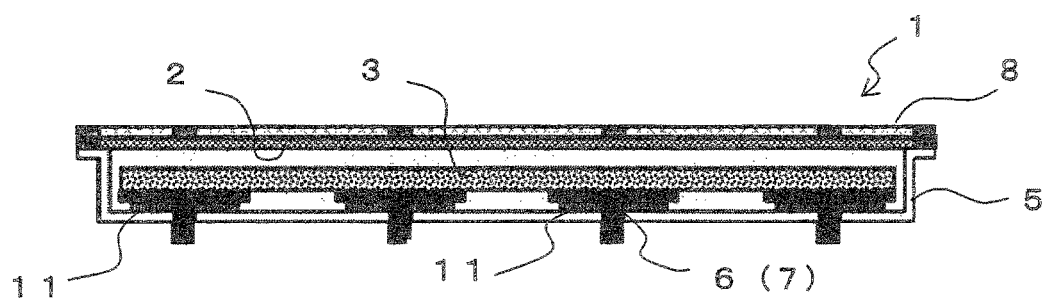

FIG. 5B is a cross sectional view of an air battery according to a fourth embodiment of the present invention. The air battery 1 of the figure includes current collecting members 6 that are integrally formed with an electrically conducting members 7 and have a T-shaped cross section, and also includes sealers 11 that are disposed between the cell frame 5 and the current collecting members 6 (7). As with the above-described embodiment, this configuration can enhance the sealing property and thereby improve the resistance to leakage of the electrolytic solution 4.

In the present invention, the electrical connection between the anode 3 and the electrically conducting member 7 may be formed by an electrically conductive double-sided tape.

Figure 6A:
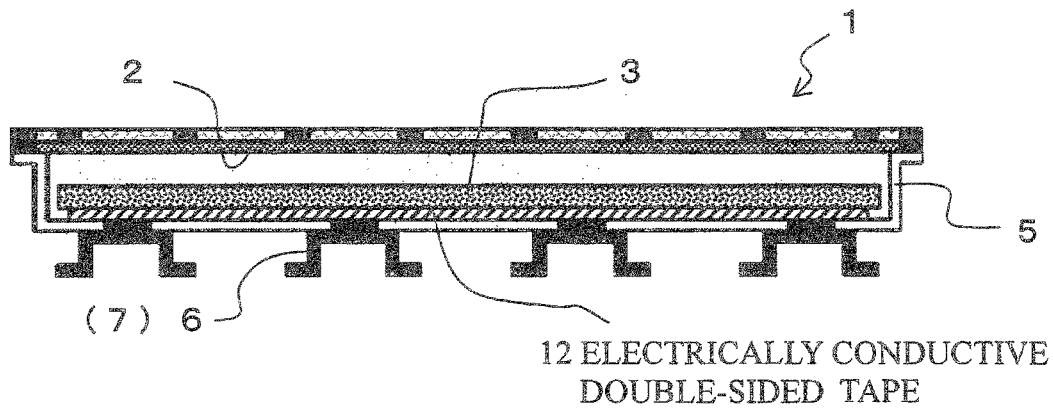
FIGS. 6A and 6B are cross sectional views of an air battery according to a fifth embodiment of the present invention, where

FIG. 6A is a cross sectional view of an air battery according to a fifth embodiment of the present invention, illustrating an example of the structure in which electrically conductive double-sided tape 12 is interposed between the anode 3 and the electrically conducting members 7. In this example, current collecting members 6 that are integrally formed with electrically conducting members are electrically connected to the anode 3 by the electrically conductive double-sided tape 12. Furthermore, a double-sided tape 12 covers the gap between through holes of a cell frame 5 and the current collecting members 6 so as to ensure the sealing property against electrolytic solution.

Figure 6B:
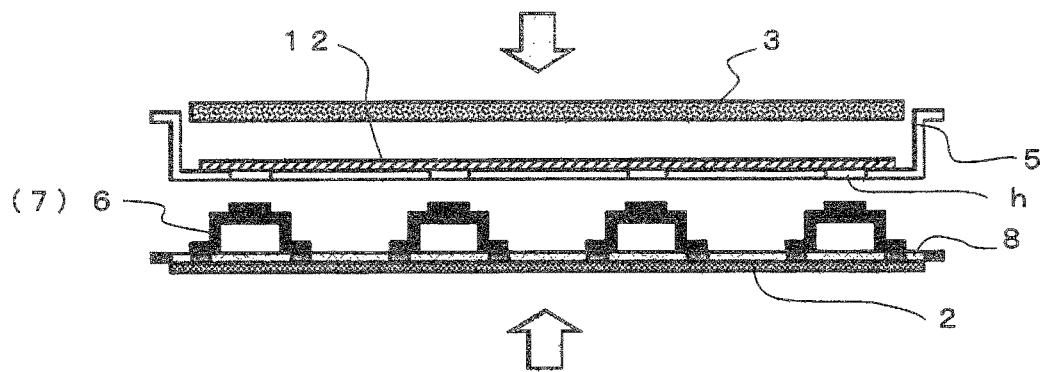

FIG. 6B is a cross sectional view illustrating a process of producing a common component used for the repetitive structure of the battery pack that is composed of the above-described air batteries 1.

As illustrated in the figure, first, the electrically conductive double-sided tape 12 is pasted on the inner side of the bottom of the cell frame 5. Then, the tips of the current collecting members 6, which are joined onto the upper side of the etching plate 8 assembled with the cathode 2 on the lower side in the figure, are inserted in through holes h of the cell frame 5 and are bonded to the electrically conductive tape 12. At the same time, the anode 3 is pressed against the electrically conductive double-sided tape 12 from above so that the anode 3 is bonded to the electrically conductive double-sided tape 12. In this way, the common component can be assembled very easily only through the above-described steps.

Furthermore, in the present invention, the cell frame 5 may be integrally formed with the electrically conducting members 7 or with the current collecting members 6 that are integrally formed with the electrically conducting members. A further simplified process can improve the resistance to liquid leakage of the battery.

Figure 7:
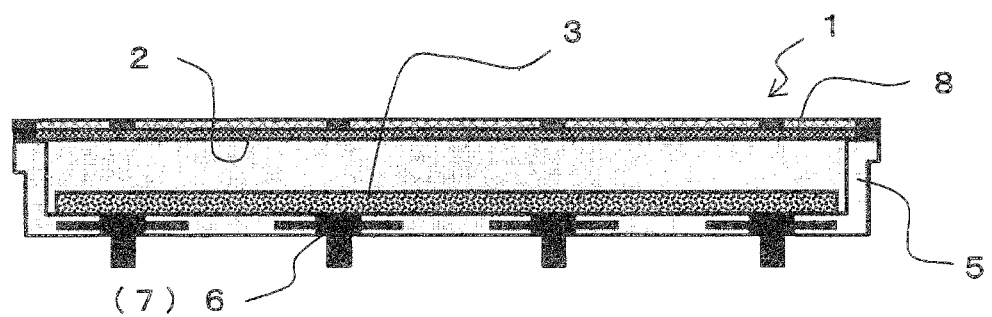
FIG. 7 is a cross sectional view of an air battery according to a sixth embodiment of the present invention, in which an integrated assembly of current collecting members and electrically conducting members is integrally molded with a cell frame.

FIG. 7 illustrates an air battery according to a sixth embodiment of the present invention. In this embodiment, current collecting members 6 that also serve as electrically conducting members and have an approximately crisscross-shaped cross section are embedded in the bottom of a cell frame 5 by integral molding. An anode 3 disposed on the bottom is electrically connected to the current collecting member 6.

FIG. 8A to 8D illustrate the steps of a method for producing the cell frame 5 that is integrally formed with the current collecting members 6.

Figure 8A:
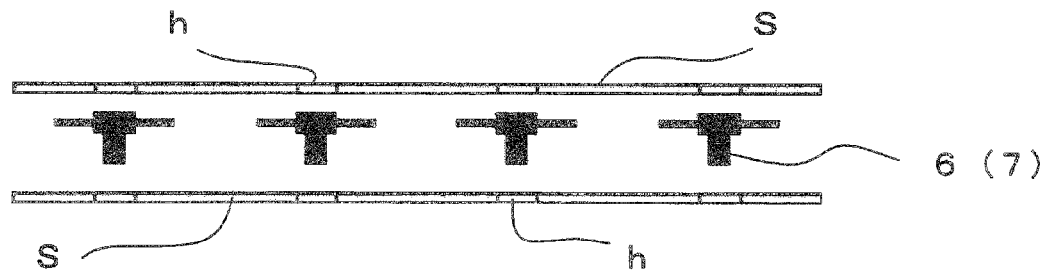
FIG. 8A to 8D illustrate the steps of a process for producing the integrated cell frame of FIG. 7.

First, as illustrated in FIG. 8A, two resin sheets S, S having through holes h at the predetermined locations are prepared, and a plurality (four in the figure) of current collecting members 6 are interposed between the resin sheets S, S.

Figure 8B:
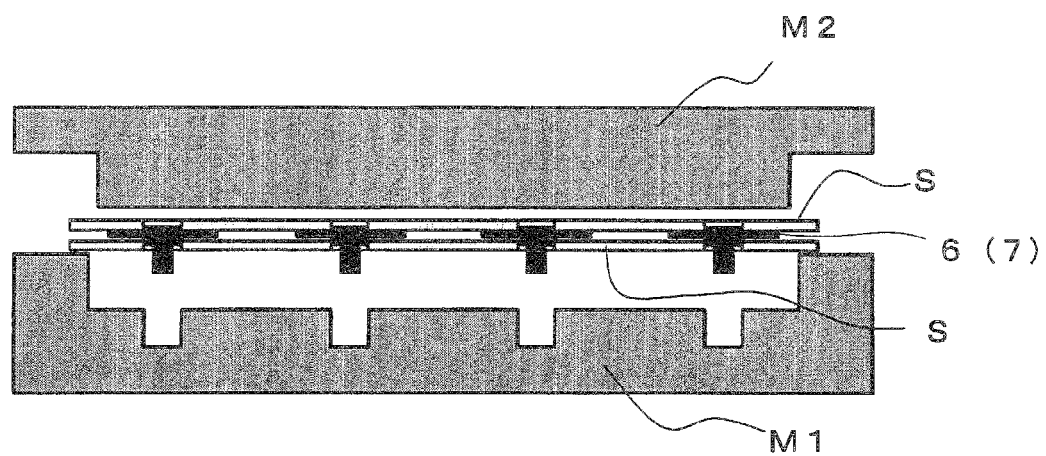

Then, as illustrated in FIG. 8B, the current collecting members 6 are placed in the through holes h of the resin sheets S, S, and they are mounted between the dies M1, M2.

Figure 8C:
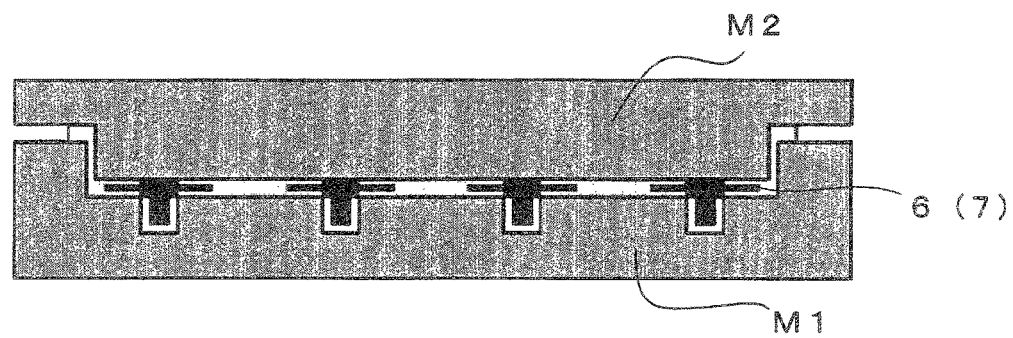

Then, as illustrated in FIG. 8C, the dies are closed, and vacuum molding is carried out. As a result, the current collecting member-integrated cell frame 5 as illustrated in FIG. 8D is complete.

Figure 9A:
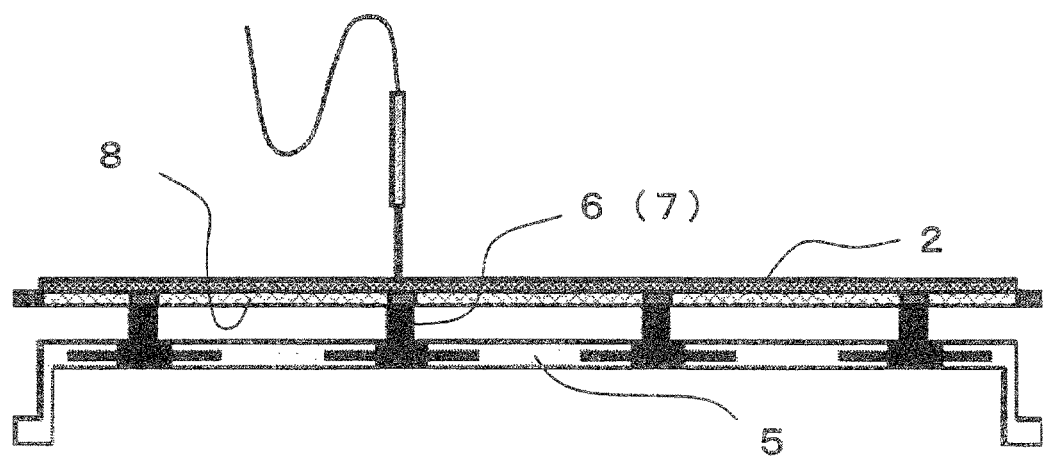
FIGS. 9A and 9B illustrate the steps of a process for producing common components of a battery pack using the integrated cell frames of FIG. 7.
Figure 9B:
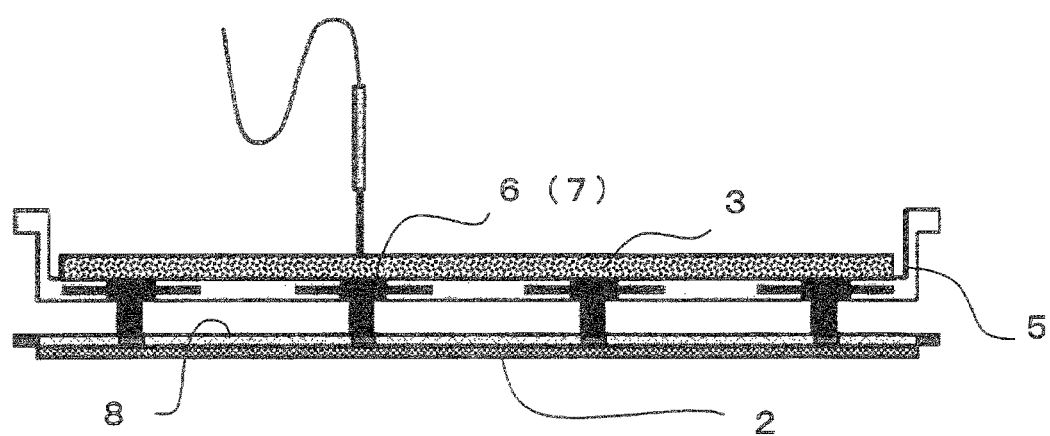

FIGS. 9A and 9B are cross sectional views illustrating a process of producing a common component that is used for the repetitive structure of a battery pack composed of air batteries with the above-described current collecting member-integrated cell frame 5.

Figure 8D:
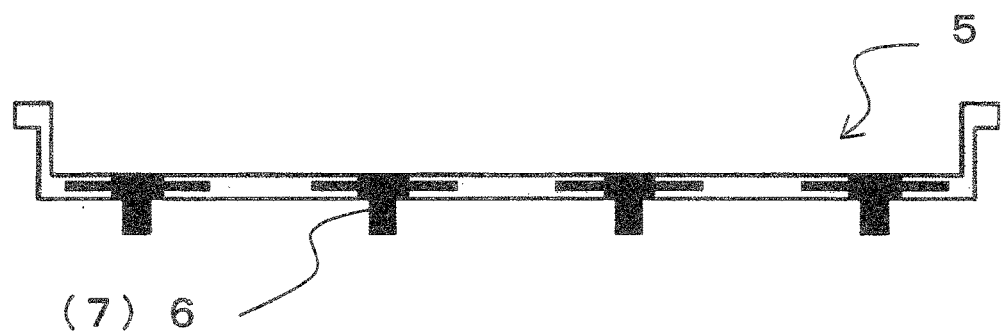

First, the integrated cell frame 5 obtained in the step of FIG. 8D is flipped over so that the current collecting members 6 protruding from the cell frame 5 face upward as illustrated in FIG. 9A, and the etching plate 8 assembled with the cathode 2 is mounted thereon with the cathode 2 facing upward.

Then, the assembly is irradiated with a laser beam from above so that the etching plate 8 assembled with the cathode 2 is joined to the tips of the current collecting members 6. In this joining step, the current collecting members 6 are joined to gas-impermeable portions (masked portions) of the etching plate 8 that are formed corresponding to the intervals of the current collecting members 6.

Then, as illustrated in FIG. 9B, the joined assembly thus obtained is flipped over, and the anode 3 is placed on the bottom of the cell frame 5 and is joined to the current collecting members 6 similarly by irradiation with a laser beam. The common component for the battery pack is thus obtained.

By stacking a lot of such common components, the battery pack is obtained. As with the battery pack of FIG. 4, the battery pack thus obtained has low current collecting loss, high output voltage, large capacity, good resistance to liquid leakage and light weight.

Figure 10A:
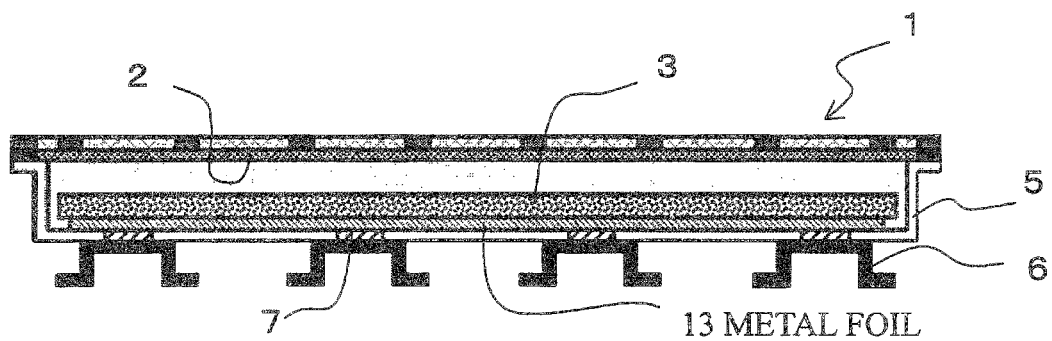
FIGS. 10A and 10B are cross sectional views of an air battery according to a seventh embodiment of the present invention, illustrating an example of the structure in which a metal foil is interposed between an anode and electrically conducting members.
Figure 10B:
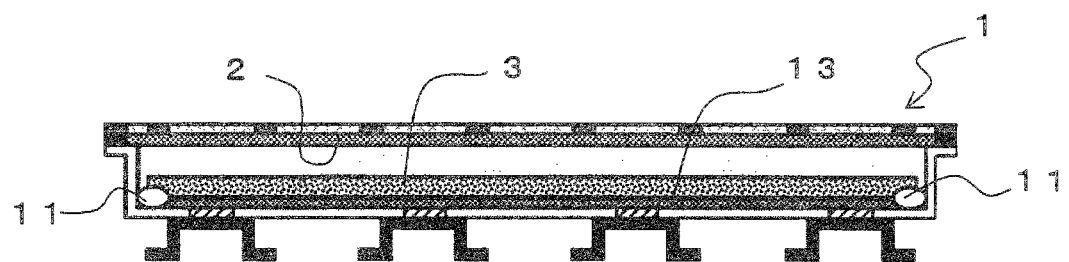

In the present invention, a metal foil 13 may be provided between the electrically conducting members 7 and the anode 3 as illustrated in FIGS. 10A and 10B.

The metal foil 13 may be made of a more noble metal than the anode metal, such as copper and stainless steel. This enables avoiding a loss of the current collecting performance even when the anode is consumed to be thin or separated into islands as the electrode reaction proceeds.

In this case, as illustrated in FIG. 10B, it is desirable that a sealer 11 is provided around the periphery of the metal foil 13. This can improve the sealing property against the electrolytic solution 4 and thereby further improve the resistance to liquid leakage.

To join the metal foil 13 to the anode 3 and the electrically conducting member 7 (integrated current collecting members 6), a variety of metallurgic joining methods such as welding, diffusion bonding and cladding may be employed as well as an electrically conductive adhesive. The metal foil 13 may not be constituted by a single continuous sheet but by multiple separate pieces.

Figure 11:
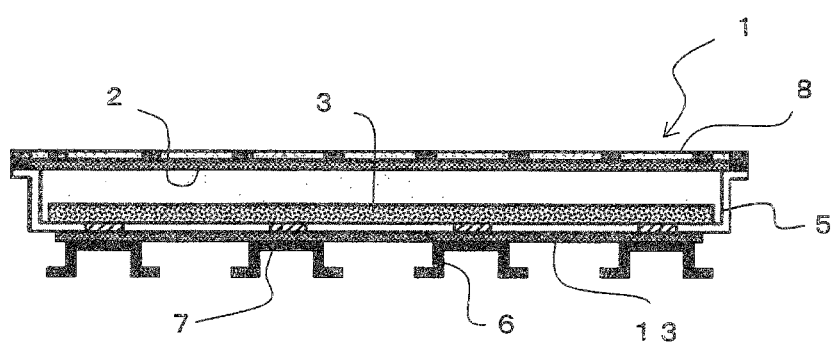
FIG. 11 is a cross sectional view of an air battery according to an eighth embodiment of the present invention, illustrating an example of the structure in which a metal foil is interposed between current collecting members and electrically conducting members.

FIG. 11 is an air battery according to an eighth embodiment of the present invention, illustrating an example of the structure in which the same metal foil 13 as above is disposed between the electrically conducting members 7 and the current collecting members 6, i.e. outside the cell frame 5.

This structure enables reducing the in-plane variation of the current collecting resistance when the anode is consumed to be thin or separated into islands as the electrode reaction proceeds. Therefore, degradation of the current collecting resistance can be reduced. Further, a sealing layer may be provided around the periphery of the metal foil, which can improve the sealing property against the electrolytic solution.

Figure 12A:
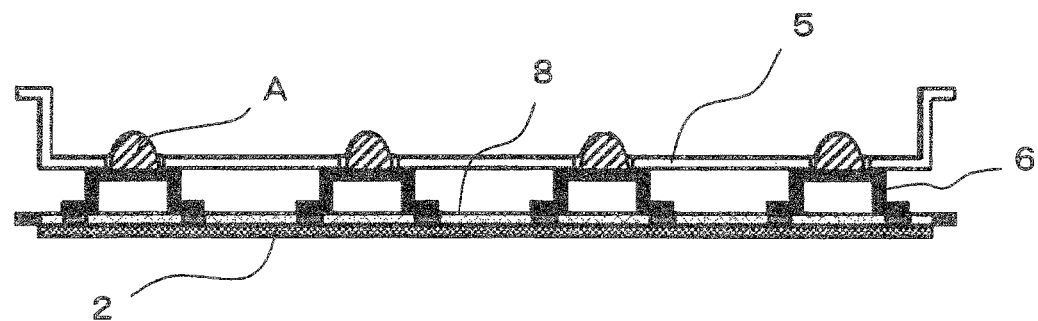
FIG. 12A to 12C illustrate the steps of a process of producing common components of a battery pack composed of air batteries as illustrated in FIG. 10A.
Figure 12B:
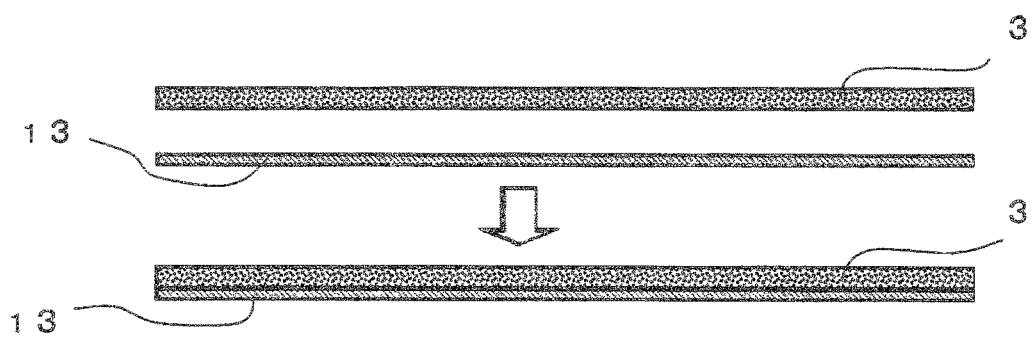
Figure 12C:
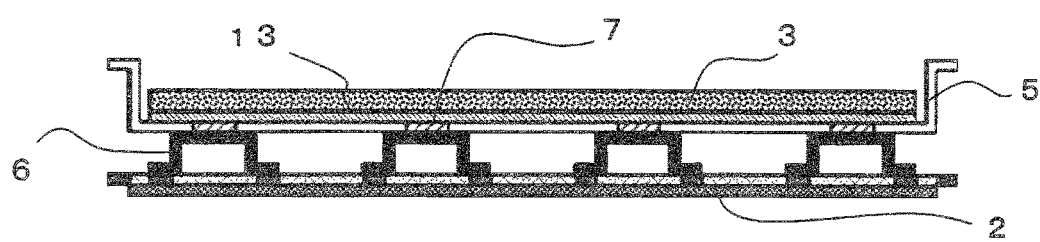

FIG. 12A to 12C illustrate the steps of a process of producing a common component that is used for the repetitive structure of a battery pack composed of the air batteries of FIG. 10A.

That is, as illustrated in FIGS. 3A and 3B, the electrically-conductive water-repellent layer and the cathode (catalyst layer) 2 are formed on the surface of the etching plate 8. Thereafter, the resultant laminate is flipped over so that the etching plate 8 faces upward, and the current collecting members 6 are joined to the predetermined portions of the etching plate 8 by laser welding, seam welding or the like.

Then, as illustrated in FIG. 12A, the cell frame 5 having through holes at the predetermined locations are mounted on the current collecting members 6 that have been joined on the etching plate 8, and electrically conductive adhesive A is applied to the parts of the current collecting members 6 that are exposed in the through holes.

Meanwhile, as illustrated in FIG. 12B, the anode 3 and the metal foil 13 are joined to each other. In this step, the means for joining the anode 3 and the metal foil 13 to each other is not particularly limited, and diffusion bonding, welding, cladding or the like can be employed. Alternatively, they may be bonded to each other by electrically conductive adhesive.

Then, the joined assembly of the anode 3 of zinc, aluminum or the like and the metal foil 13 as illustrated in FIG. 12B is placed over the electrically conductive adhesive A and is bonded thereto by applying a pressure. Then, the electrically conductive adhesive A spreads in the through holes of the cell frame 5 so as to ensure the sealing property. Furthermore, the solidified electrically conductive adhesive A serves as the electrically conducting member 7 so as to electrically connect the current collecting member 6 with the metal foil 13 and the anode 3.

The common component for the battery pack is thus complete as illustrated in FIG. 12C.

Figure 13:
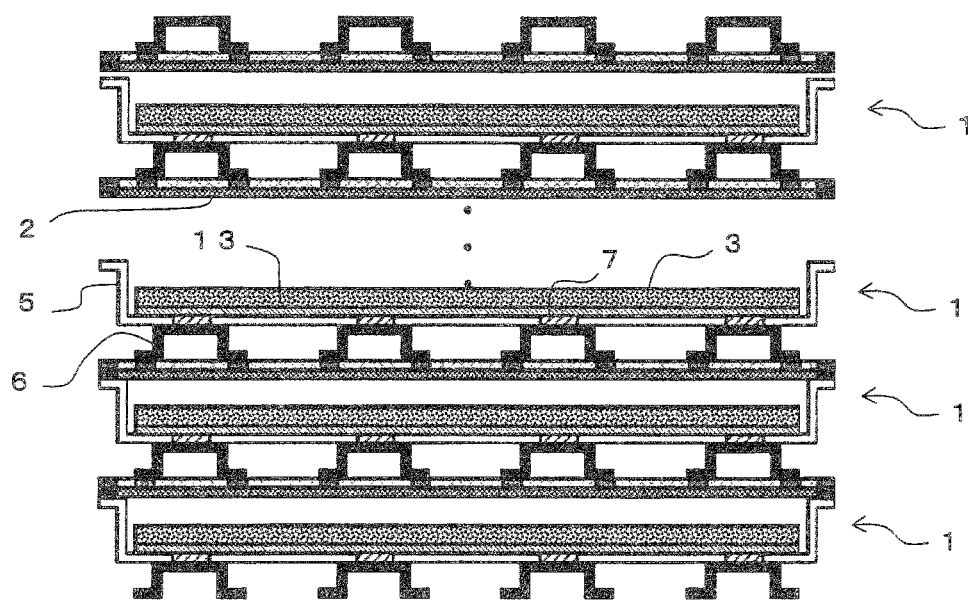
FIG. 13 is a cross sectional view of a completed battery pack using the common components produced by the steps illustrated in FIG. 12A to 12C.

Then, adhesive is applied on the upper outer part of the peripheral part of the cell frame 5 of the common component. By stacking a lot of those common components, the battery pack as illustrated in FIG. 13 is obtained. The completed battery pack has high-capacity, low current collecting loss and high output voltage.

The air battery of the present invention includes a plurality of electrically conducting members 7 or a plurality of current collecting members 6 integrally formed with the electrically conducting members as described above, and the electrically conducting members 7 or the current collecting members 6 penetrate the bottom of the cell frame 5 so as to ensure electrical connection with the anode 3.

These electrically conducting members 7 or the integrated current collecting member 6 may have either long continuous shape or short intermittent shape.

Figure 14A:
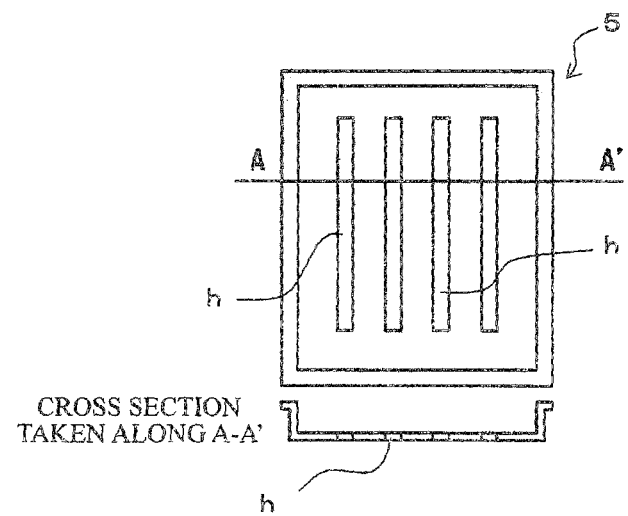
FIGS. 14A and 14B are a plan view and a cross sectional view of a cell frame, illustrating an example of the shape of through holes that are formed in the cell frame for penetration of electrically conducting members.

FIG. 14A illustrates an example of the through holes h formed in the cell frame 5 in which the electrically conducting members 7 or the integrated current collecting members 6 have a long shape. Naturally, the through holes h also have a long continuous shape according to these members.

With this configuration, the number of components can be reduced, and the steps of joining these components to the etching plate 8 and fitting them to the through holes h of the cell frames 5 can be simplified. Therefore, the production cost can be reduced.

Figure 14B:
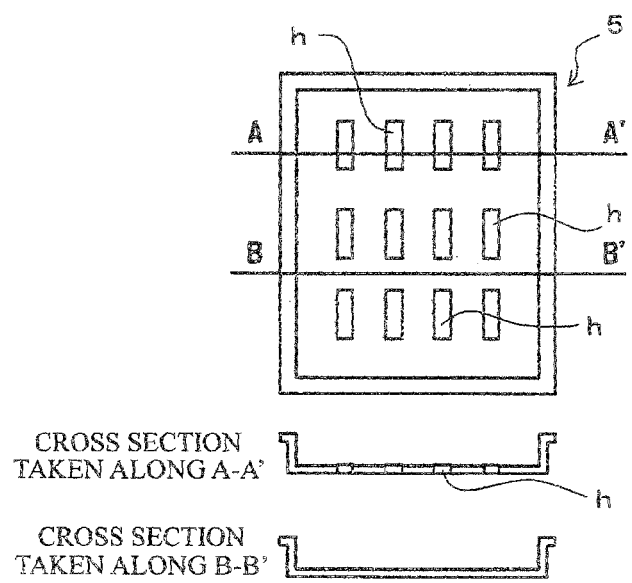

FIG. 14B illustrates the through holes h formed in the cell frame 5 in which the electrically conducting members 7 or the integrated current collecting members 6 have a short shape and is intermittent in the longitudinal direction. Naturally, the through holes h also have a short discontinuous shape according to these members.

By using the discontinuous electrically conducting members 7 or integrated current collecting members 6, even when the inner temperature of the battery changes, the resulting thermal stress due to the difference in thermal expansion from the cell frame 5 can be reduced. Therefore, deformation of the cell frame 5 or breakage thereof due to the deformation can be prevented.

The invention claimed is:

1. An air battery, comprising:
 a cell frame of an insulating material having a frame portion and a bottom portion being integral with and extending inwardly from one end of the frame portion, in which an electrolytic solution and an anode are stored, wherein the bottom portion has a plurality of through holes defined therein;
 a cathode that is disposed opposite the anode across the electrolytic solution stored in the cell frame; and
 a plurality of current collecting members on one side of the bottom portion of the cell frame opposite the anode, each current collecting member electrically connected to the anode via a respective electrically conducting member extending from the current collecting member through a respective through hole, wherein each electrically conducting member is physically disconnected from other electrically conducting members and electrically connected to the anode, wherein the current collecting member serves as a spacer to form a ventilation space between adjacent air batteries,
 wherein each of the plurality of through holes in the bottom portion of the cell frame is an elongated hole extending along a longitude of the bottom portion of the cell frame and each current collecting member is an elongated structure having a pair of legs with a seat portion at the end of each leg.

2. The air battery according to claim 1, wherein each electrically conducting member is integrally formed with the bottom portion of the cell frame.

3. The air battery according to claim 1, further comprising:
 a sealer disposed between the cell frame and each current collecting member.

4. The air battery according to claim 1, wherein the anode and each electrically conducting member are electrically connected to each other by an electrically conductive double-sided tape.

5. The air battery according to claim 1 further comprising:
 a metal foil disposed between and electrically connecting the anode and each electrically conducting member.

6. The air battery according to claim 1 further comprising:
 a metal foil disposed between each current collecting member and the respective electrically conducting member.

7. The air battery according to claim 1 wherein each current collecting member is integrated with the respective electrically conducting member.

8. The air battery according to claim 1 wherein each of the plurality of through holes in the bottom portion of the cell frame where the plurality of electrically conducting members penetrate has a continuous length along a longitude of the bottom portion of the cell frame.

9. The air battery according to claim 1 wherein the plurality of through holes in the bottom portion of the cell frame where the plurality of electrically conducting members penetrate are spaced intermittently along a longitude of the bottom portion of the cell frame.

10. A battery pack, comprising:
 a stacked plurality of the air battery according to claim 1.

11. The air battery of claim 1, wherein each electrically conducting member extends through a respective through hole such that a surface of each electrically conducting member is flush with an inner surface of the bottom portion of the cell frame.

12. An air battery, comprising:
 a cell frame of an insulating material having a frame portion and a bottom portion being integral with and extending inwardly from one end of the frame portion, in which an electrolytic solution and an anode are stored, wherein the bottom portion has a plurality of through holes defined therein;
 a cathode that is disposed opposite the anode across the electrolytic solution stored in the cell frame;
 a plurality of discrete current collecting members that are positioned on the bottom portion opposite the anode and are electrically connected to the anode through the plurality of through holes; and
 electrically conductive double-sided tape electrically connecting the anode and the plurality of discrete current collecting members,
 wherein each of the plurality of through holes in the bottom portion of the cell frame is an elongated hole extending along a longitude of the bottom portion of the cell frame and each current collecting member is an elongated structure having a pair of legs with a seat portion at the end of each leg.

* * * * *